(12) United States Patent
Ito et al.

(10) Patent No.: US 8,674,819 B2
(45) Date of Patent: Mar. 18, 2014

(54) VEHICULAR OBSTACLE NOTIFICATION APPARATUS

(75) Inventors: Toshiyuki Ito, Anjo (JP); Fumihiro Tamaoki, Nagoya (JP); Tetsuya Enokizaka, Nagoya (JP)

(73) Assignee: Denso Corporation, Kariya (JP)

( * ) Notice: Subject to any disclaimer, the term of this patent is extended or adjusted under 35 U.S.C. 154(b) by 202 days.

(21) Appl. No.: 13/328,316

(22) Filed: Dec. 16, 2011

(65) Prior Publication Data

US 2012/0161951 A1    Jun. 28, 2012

(30) Foreign Application Priority Data

Dec. 23, 2010 (JP) .................................. 2010-286802

(51) Int. Cl.
*B60Q 1/00* (2006.01)

(52) U.S. Cl.
USPC ............................ 340/435; 340/436; 701/301

(58) Field of Classification Search
USPC .................................. 340/435, 436; 701/301
See application file for complete search history.

(56) References Cited

U.S. PATENT DOCUMENTS

| | | | |
|---|---|---|---|
| 7,532,109 B2 * | 5/2009 | Takahama et al. ............ | 340/436 |
| 8,164,432 B2 * | 4/2012 | Broggi et al. ................ | 340/435 |

FOREIGN PATENT DOCUMENTS

| | | |
|---|---|---|
| JP | 2000-353298 | 12/2000 |
| JP | 2003-104146 | 4/2003 |
| JP | 2004-178610 | 6/2004 |
| JP | 2009-098956 | 5/2005 |
| JP | 2007-251257 | 9/2007 |
| JP | 2008-009703 | 1/2008 |
| JP | 2008-152390 | 7/2008 |
| JP | 2011-022884 | 2/2011 |
| JP | 2011-044063 | 3/2011 |
| WO | WO 2008/075407 | 6/2008 |

OTHER PUBLICATIONS

Office action dated Jan. 29, 2013 in corresponding Japanese Application No. 2010-286802.

* cited by examiner

*Primary Examiner* — Toan N Pham
(74) *Attorney, Agent, or Firm* — Harness, Dickey & Pierce, PLC (57) ABSTRACT

In a vehicular obstacle notification apparatus, a notification priority is determined from two of (i) a collision possibility between an obstacle and a subject vehicle and (ii) a region priority specific to an obstacle, instead of only from the collision possibility. Even if the collision possibility is high, the notification priority may become low when the region priority is low. In contrast, even if the collision possibility is low, the notification priority may become high when the region priority is high. Thus, the warning or warning notification to the driver with respect to obstacles can be executed effectively in an order of the necessity of urging the driver to take precautions, in comparison with the case where the notification priority is determined only based on the collision possibility.

10 Claims, 6 Drawing Sheets

IN LEFT-HAND TRAFFIC

INDEXES OF W. REGIONS

| K | L | M | O | Q |
|---|---|---|---|---|
| I | J | N | P | R |
| G | H | | | |
| E | F | | | |
| C | D | | | |
| A | B | | | |

IN LEFT-HAND TRAFFIC

FIG. 8

REGION PRIORITY FROM ROAD MAP INFO

| 5 | 3 | 1 | 7 | 13 |
|---|---|---|---|----|
| 6 | 4 | 2 | 8 | 14 |
| 9 | 10 | | | |
| 11 | 12 | | | |
| 15 | 16 | | | |
| 18 | 17 | | | |

IN LEFT-HAND TRAFFIC

VEHICULAR OBSTACLE NOTIFICATION APPARATUS

CROSS REFERENCE TO RELATED APPLICATION

The present application is based on and incorporates herein by reference Japanese Patent Application No. 2010-286802 filed on Dec. 23, 2010.

FIELD OF THE INVENTION

The present invention relates to a vehicular obstacle notification apparatus in a vehicle to determine a notification priority in reporting existence relative to several obstacles.

BACKGROUND OF THE INVENTION

[Patent document 1] JP 2008-9703 A
[Patent document 2] WO 2008-075407 A1

There is known a technology to detect an obstacle in a periphery of a vehicle and notify a driver of an existence of the obstacle (see Patent documents 1, 2). Patent document 1 recites calculating of a danger degree of the obstacle to thereby execute a notification operation according to the danger degree. This danger degree is calculated based on a distance to the obstacle, and a kind of the obstacle. In addition, Patent document 2 recites determining of a collision possibility of colliding with the obstacle to thereby output a warning when there is a collision possibility.

Suppose a case where the technology of notifying the driver of the obstacle existence operates in the situation where many obstacles exist in a periphery of the vehicle that is going to turn at an intersection. In such a case, even if the existences of many obstacles are reported, the driver may sense troublesome or, be confused about the existences of too many obstacles.

To that end, the order of the notification relative to the detected obstacles may be determined; thereby, based on the determined order, the existences of the obstacles may be notified. Further, the technology in Patent document 1 may be used for calculating the danger degree depending on the distance to the obstacle, or the kind of obstacle; thereby, the notification may be preferentially made for the obstacle having the higher danger degree. However, the priority of the obstacle which the driver must be careful of is not always correlative to the distance of the obstacle.

In addition, the technology in Patent document 2 may be used for designating the priority in notification based on the collision possibility. However, the priority of the obstacle which the driver must be careful of is not always identical to the order of the collision possibility.

SUMMARY OF THE INVENTION

It is an object of the present invention to provide a vehicular obstacle notification apparatus to execute an obstacle notification in an order of a degree of necessity of attention by a driver.

To achieve the above object, according to an aspect of the present invention, a vehicular obstacle notification apparatus in a vehicle to report an existence of an obstacle existing in a periphery is provided as follows. A correspondence relation designation section is included to designate a plurality of regions in the periphery of the vehicle and then designate a correspondence relation between the regions and region priorities, respectively. An obstacle position acquisition section is included to acquire a position of an obstacle which exists in the periphery of the vehicle. A collision possibility determination section is included to determine a collision possibility with the vehicle with respect to the obstacle whose position is acquired by the obstacle position acquisition section. A region priority determination section is included to determine an obstacle-specific region priority with respect to an obstacle whose position is acquired by the obstacle position acquisition section based on (i) a correspondence relation designated by the correspondence relation designation section and (ii) a present position or a future position of the obstacle whose position is acquired by the obstacle position acquisition section. A notification priority determination section is included to determine a notification priority specific to an obstacle whose position is acquired by the obstacle position acquisition section, based on (i) an obstacle-specific region priority determined by the obstacle-specific region priority determination section and (ii) a collision possibility determined by the collision possibility determination section. A notification section is included to execute a notification on obstacle based on the notification priority determined by the notification priority determination section.

Even if the collision possibility is high, the notification priority may become low when the region priority is low. In contrast, even if the collision possibility is low, the notification priority may become high when the region priority is high. Under the above configuration, the warning or warning notification to the driver with respect to an obstacle can be executed effectively in an order of the necessity of urging the driver to take precautions, in comparison with the case where the notification priority is determined only based on the collision possibility.

According to another aspect of the present invention, a vehicular obstacle notification apparatus in a vehicle to notify a driver of the vehicle of an obstacle existing in a periphery of the vehicle is provided as follows. A predicted route determination device is included to determine a predicted travel route of the vehicle. An obstacle information acquisition section is included to acquire a position of an obstacle and a type of the obstacle, the position being included in the predicted travel route. A correspondence relation designation section is included to designate a plurality of regions in the periphery of the vehicle based on a configuration of a road map and then designate a correspondence relation between the regions and region priorities, respectively. Herein, the correspondence relation is designated such that a crosswalk region overlapping with a crosswalk and an intersection region overlapping with an intersection are assigned with a higher priority as compared with a region other than the crosswalk region and the intersection region. A region priority determination section is included to determine an obstacle-specific region priority with respect to an obstacle, whose position and type are acquired by the obstacle information acquisition section, the position of the obstacle being included in the predicted travel route. A notification section is included to execute a notification on obstacle based on the obstacle-specific region priorities determined by the region priority determination section. In cases where the predicted travel route indicates that the vehicle needs to turn the intersection by passing across an oncoming traffic within the intersection and then pass across a crosswalk located after exiting the intersection, when the acquired positions and the types of the obstacles indicate that a pedestrian serving as one of the obstacles is existing or predicted to exist in the crosswalk and an oncoming vehicle serving as one of the obstacles is existing or predicted to exist in the oncoming traffic within the intersection, the obstacle-specific region priority assigned to the pedestrian is higher than the obstacle-specific region priority assigned to the oncoming vehicle.

Under such a configuration, even if a pedestrian on a crosswalk has a lower collision possibility with the vehicle while an oncoming vehicle at the intersection has a higher collision possibility, the pedestrian may be reported to the driver of the vehicle in preference to the oncoming vehicle, thereby securing a safety of a human being on the crosswalk more than that of the oncoming vehicle.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

The following describes an embodiment of the present invention with reference to drawings.

The following is premised that a driving assistance system 1 according to an embodiment of the present invention is used in a left-hand traffic rule used in Japan or Great Britain. Needless to say, without need to be limited thereto, the driving assistance system according to the embodiment can be used in a right-hand traffic rule used in the United States of America. In such a case, only the relation between the right and the left may be reversed.

Figure 1:
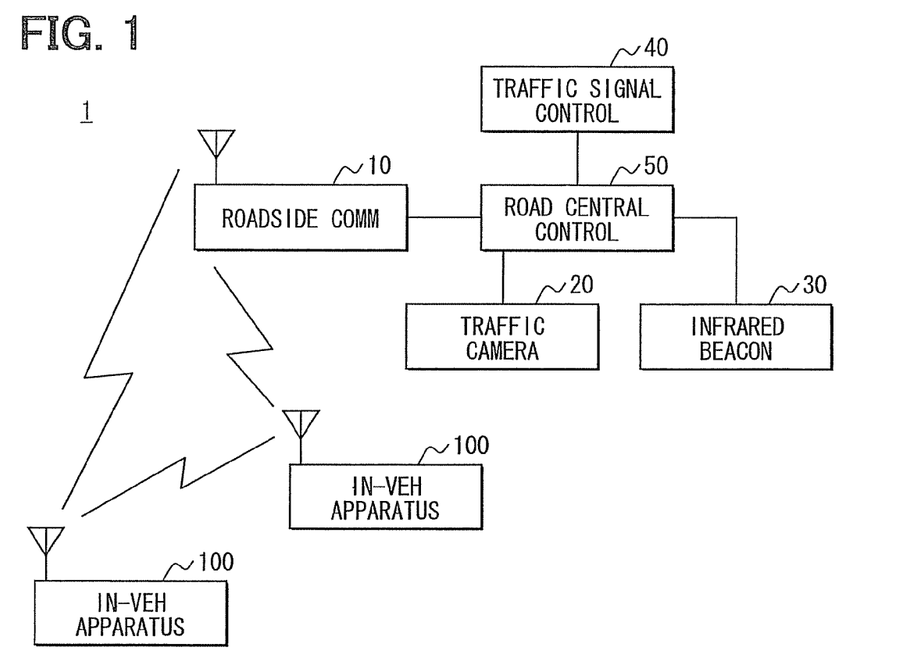
FIG. 1 is a block diagram illustrating an overall configuration of a driving assistance system according to an embodiment of the present invention.

The driving assistance system 1 in FIG. 1 exists in an assistance service area including an intersection under the left-hand traffic rule; the system 1 notifies a vehicle, which turns right at the intersection, of an existence of an obstacle. FIG. 1 is a block diagram illustrating an overall configuration of the driving assistance system 1.

As indicated in FIG. 1, the driving assistance system 1 includes a roadside communication apparatus 10, a traffic camera 20 (also referred to as a road-view camera), an infrared beacon 30 (also referred to as a light beacon), a traffic signal controller 40, and a road central control apparatus 50. These apparatuses are provided as infrastructure equipment. The driving assistance system 1 further includes several in-vehicle apparatuses 100, which are mounted in respective vehicles, as well as the infrastructure equipment.

Figure 2:
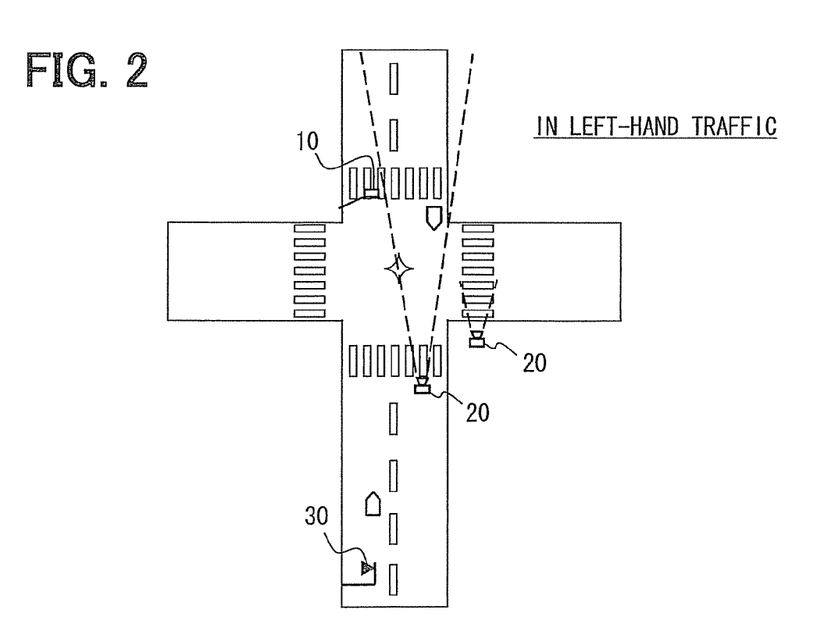
FIG. 2 is a diagram illustrating installation positions of a road-data wireless instrument, a traffic camera, and an infrared beacon, around an intersection.

The roadside communication apparatus 10 (also referred to as a road-data wireless apparatus) is arranged in a predetermined position of an intersection, for instance, over a pedestrian crosswalk around the intersection, as illustrated in FIG. 2. The roadside communication apparatus 10 transmits various intersection information to a periphery of this intersection to cover over all the range of 360 degrees, using electric waves of a predetermined frequency band, such as a 700 MHz band. This intersection information includes (i) information which indicates a signal cycle of a signal of the intersection in which the roadside communication apparatus 10 is arranged; (ii) information which indicates the presence or absence (i.e., an existence or non-existence) and the position of an obstacle such as a vehicle which runs a road which enters the intersection; and (iii) information which indicates whether an obstacle exists on a crosswalk of the periphery of the intersection, or a vicinity of the crosswalk.

The traffic camera 20 is arranged over a road position that is located across the intersection from an oncoming traffic lane or road that enters the intersection, so as to capture an image of a vehicle entering the intersection through the oncoming traffic lane. In addition, apart from it, another traffic camera is arranged over a side walk position in the periphery of the intersection so as to capture an image of a crosswalk in the periphery of the intersection (refer to FIG. 2). It is noted that FIG. 2 illustrates a single traffic camera 20 over a road position and a single traffic camera 20 over a side walk, for the sake of simplicity. In fact, the traffic camera 20 over a road position is provided for each of all the oncoming traffic lanes or roads; the traffic camera 20 over a side walk is also provided for each of all the crosswalks around the intersection. These traffic cameras 20 are communicated with the road central control apparatus 50 using wired links, and outputs the captured images to the road central control apparatus 50, successively or with predetermined time intervals.

The infrared beacon 30 is arranged over a road position for each traffic lane after exiting the intersection. The infrared beacon 30 transmits predetermined information successively or with predetermined time intervals, to a vehicle that runs the intersection. The transmitted predetermined information includes road traffic information, a distance up to a next intersection, and a road shape of the next intersection. In addition, the infrared beacon 30 detects that a vehicle passes a position below the infrared beacon 30 by executing two-way communication with a infrared beacon antenna mounted in the vehicle. The infrared beacon 30 is also communicated with the road central control apparatus 50 using a wired link, and transmits to the road central control apparatus 50 a signal which indicates the detection of the vehicle having passed. The road central control apparatus 50 may be communicated with the traffic camera 20 or the infrared beacon 30 using a wireless link.

The traffic signal controller 40 switches lamplight colors of the signal lights or traffic signals installed in the intersection periodically in a predetermined order. In addition, the traffic signal controller 40 transmits successively information which indicates the lamplight color of the signal light to the road central control apparatus 50.

The road central control apparatus 50 includes a computer equipped with a CPU, ROM, and RAM. The CPU executes a program stored in the ROM while using a temporary storage function of the RAM, thereby enabling the road central control apparatus 50 to execute an obstacle detection process and an information transmission process. The obstacle detection process analyzes an image captured by the traffic camera 20 to thereby detect an obstacle which runs a road that enters an intersection, and an obstacle which exists on a crosswalk or a vicinity of the crosswalk. It is noted that the present embodiment is premised that an obstacle is an object which may collide with a subject vehicle when traveling a road. The obstacle includes a moving object and a temporarily stopping object, but does not include an unmoved object that is fixedly stationary.

The information transmission process transmits successively, from the roadside communication apparatus 10, an obstacle position of an obstacle detected by the obstacle detection process, lamplight colors of the signal lights for the predetermined number of cycles from the present time (e.g., for example, two cycles), and a road shape of the intersection stored previously.

Figure 3:
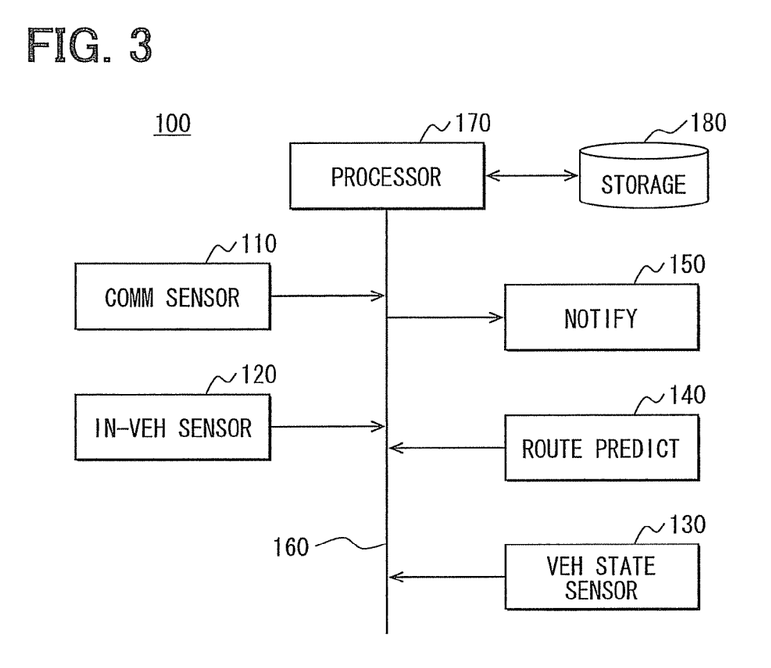
FIG. 3 is a diagram illustrating a configuration of an in-vehicle apparatus.

Next, the following explains a configuration of the in-vehicle apparatus 100 with reference to FIG. 3. This in-vehicle apparatus 100 may be referred to as a vehicular obstacle notification apparatus. The in-vehicle apparatus 100 includes a communication-related sensor instrument 110, an in-vehicle autonomous sensor instrument 120, a vehicle state sensor instrument 130, a route prediction instrument 140, a notification instrument 150; a processor 170 connected with the foregoing instruments via an in-vehicle LAN 160, and a storage instrument 180.

The communication-related sensor instrument 110 includes a sensor or a communication instrument to communicate with an external source external to the subject vehicle to thereby acquire vehicular peripheral information that is information of a periphery of the subject vehicle. The communication-related sensor instrument 110 achieves a road-to-vehicle communication and inter-vehicle communication. The communication-related sensor instrument 110 may achieve only one of the road-to-vehicle communication and inter-vehicle communication. In the present embodiment, both of the road-to-vehicle communication and inter-vehicle communication are provided in the communication-related sensor instrument 110. Thus, the communication-related sensor instrument 110 includes several sensors or communication instruments. To achieve a road-to-vehicle communication, the communication-related sensor instrument 110 includes an infrared beacon antenna, and an in-vehicle wireless instrument which communicates with the roadside communication apparatus 10.

The in-vehicle autonomous sensor instrument 120 acquires physical information such as light and sound directly, instead of using the communication; thereby, the instrument 120 includes a sensor that detects an obstacle in a periphery of the subject vehicle. The in-vehicle autonomous sensor instrument 120 includes an in-vehicle camera and a millimeter wave radar, for example.

The vehicle state sensor instrument 130 includes a sensor which detects a quantity of state relevant to a travel (travel speed, travel direction) of the subject vehicle. For example, the vehicle state sensor instrument 130 includes a vehicle speed sensor and a steering angle sensor.

The route prediction instrument 140 predicts a route (predicted travel route) from now on of the subject vehicle. For example, the route prediction instrument 140 includes a navigation apparatus while the predicted travel route may be used as a guidance route. In addition, the route prediction instrument 140 may be an apparatus to generate a travel track of the subject vehicle based on the information of the vehicle state sensor instrument 130, and calculate as a predicted travel route a route which is obtained by extending the travel track to a heading direction of the subject vehicle. In addition, the route prediction instrument 140 may determine a traffic lane the subject vehicle is running from the communication-related sensor instrument 110 (e.g., a sensor which communicates with the infrared beacon 30), or the in-vehicle autonomous sensor instrument 120 (e.g., a camera), and take the traffic lane the subject vehicle is running presently into consideration; thereby, a predicted travel track may be obtained to predict a traffic lane the subject vehicle is running. Further, the route prediction instrument 140 updates the predicted travel route successively with predetermined time intervals. The route prediction instrument 140 may be referred to as a predicted route determination device, section, or means.

Figure 4:
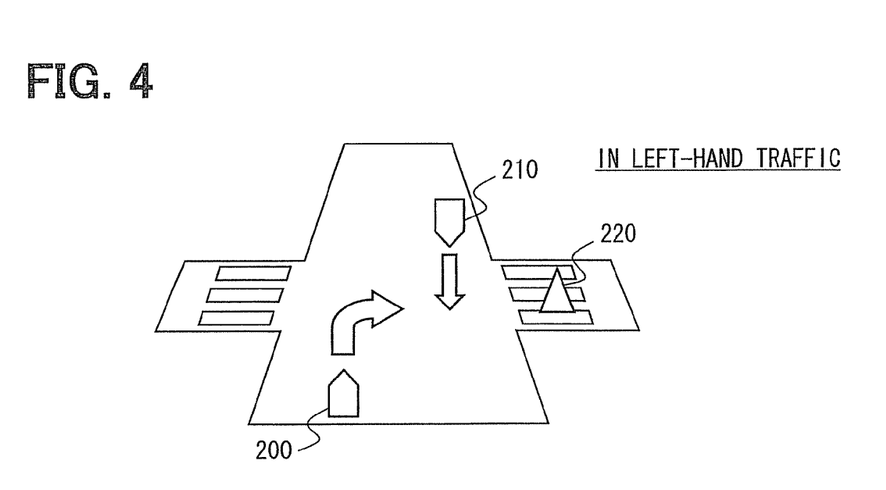
FIG. 4 is a diagram illustrating a peripheral map of an intersection.

The notification instrument 150 performs an obstacle notification to notify a driver of information relative to an obstacle. For example, the notification instrument 150 includes a display unit arranged in a specified position of a vehicle compartment to enable the driver to view, and a speaker which outputs a sound in the vehicle compartment. FIG. 4 illustrates a display example displayed in the display unit when the subject vehicle turns right at an intersection under a left-hand traffic rule. The display example in FIG. 4 is a three-dimensional view of a peripheral map of an intersection that is seen obliquely from a view point of a position over the subject vehicle that approaches the intersection to enter the intersection. This peripheral map of the intersection is stored previously. The peripheral map of the intersection illustrates, in superimposition, a subject vehicle graphic sign 200 indicating the subject vehicle, an oncoming vehicle graphic sign 210 indicating an oncoming vehicle, and a pedestrian graphic sign 220 indicating a pedestrian on a crosswalk. In addition, each of the subject vehicle graphic sign 200 and the oncoming vehicle graphic sign 210 has an arrow that indicates a heading direction.

The processor 170 includes a computer equipped with a CPU, ROM, and RAM. The CPU executes a program stored in the ROM while using a temporary storage function of the RAM, thereby enabling the processor 170 to execute an obstacle notification process to notify a driver of an existence of an obstacle existing in a periphery of the subject vehicle using the notification instrument 150. In addition, the various processes are executed in advance to this obstacle notification process. The storage instrument 180 stores a collision possibility list and a warning region map designated by the processor 170.

Figure 5:
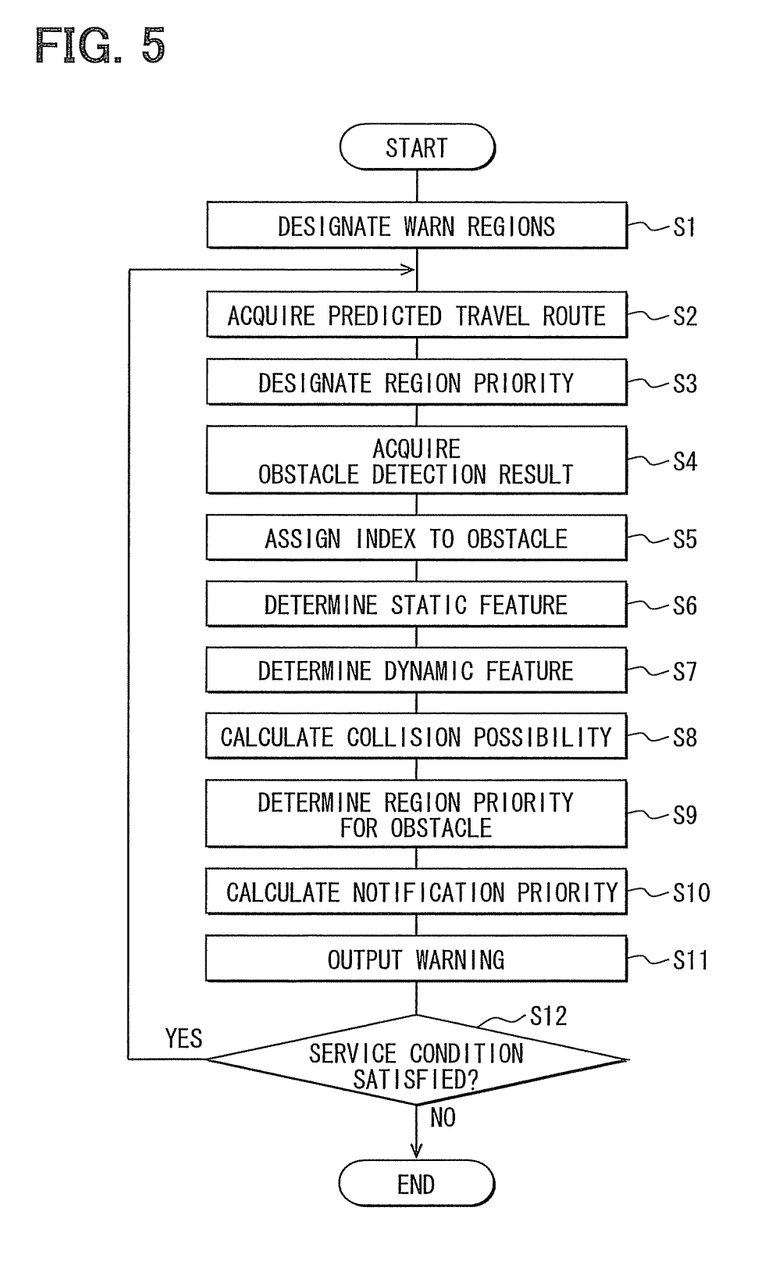
FIG. 5 is a flowchart diagram illustrating a process executed by a processor of the in-vehicle apparatus of FIG. 3.

FIG. 5 is a flowchart diagram illustrating a process executed by the processor 170 of the in-vehicle apparatus 100. The processor 170 starts the process indicated in FIG. 5 when a predetermined service condition is satisfied. As mentioned above, the driving assistance system 1 of the present embodiment reports an existence of an obstacle to a vehicle that exists in an assistance service area including an intersection. Therefore, the predetermined service condition includes a state where a subject vehicle exists in an assistance service area.

The assistance service area is defined as an area from a predetermined start position short of an intersection before the subject vehicle enters the intersection up to a predetermined end position across the intersection after the subject vehicle turns right at the intersection. The start position of the area may be determined from a coordinate or a distance from the intersection. Alternatively, the start position may be a position where the subject vehicle passes the infrared beacon 30, or a position where the subject vehicle receives a signal from the roadside communication apparatus 10. When the start position is determined based on the distance from the intersection, the start position is previously stored in map information and present position information is acquired from a navigation apparatus, thereby determining the start position. The end position of the area may be determined from a coordinate or a distance from the intersection; further, it may be determined based on a distance from the start position.

In addition, whether to turn right at an intersection in a left-hand traffic rule is determined; thus, the service condition may include a state where a direction indicator is switched into a right turn indicating state, or a state where a right turn indicator is in an ON state. When the above two conditions of (i) the state where a subject vehicle exists in an assistance service area, and (ii) the state where a right turn indicator is in an ON state are satisfied at the same time, the processor 170 starts the process in FIG. 5.

It is further noted that a flowchart or the processing of the flowchart in the present application includes sections (also referred to as steps), which are represented, for instance, as S1. Further, each section can be divided into several subsections while several sections can be combined into a single section. Furthermore, each of thus configured sections can be referred to as a device, means, module, or processor and achieved not only as a software section in combination with a hardware device but also as a hardware section. Furthermore, the software section may be included in a software program, which may be contained in a non-transitory computer-readable storage media as a program product.

Figure 6:
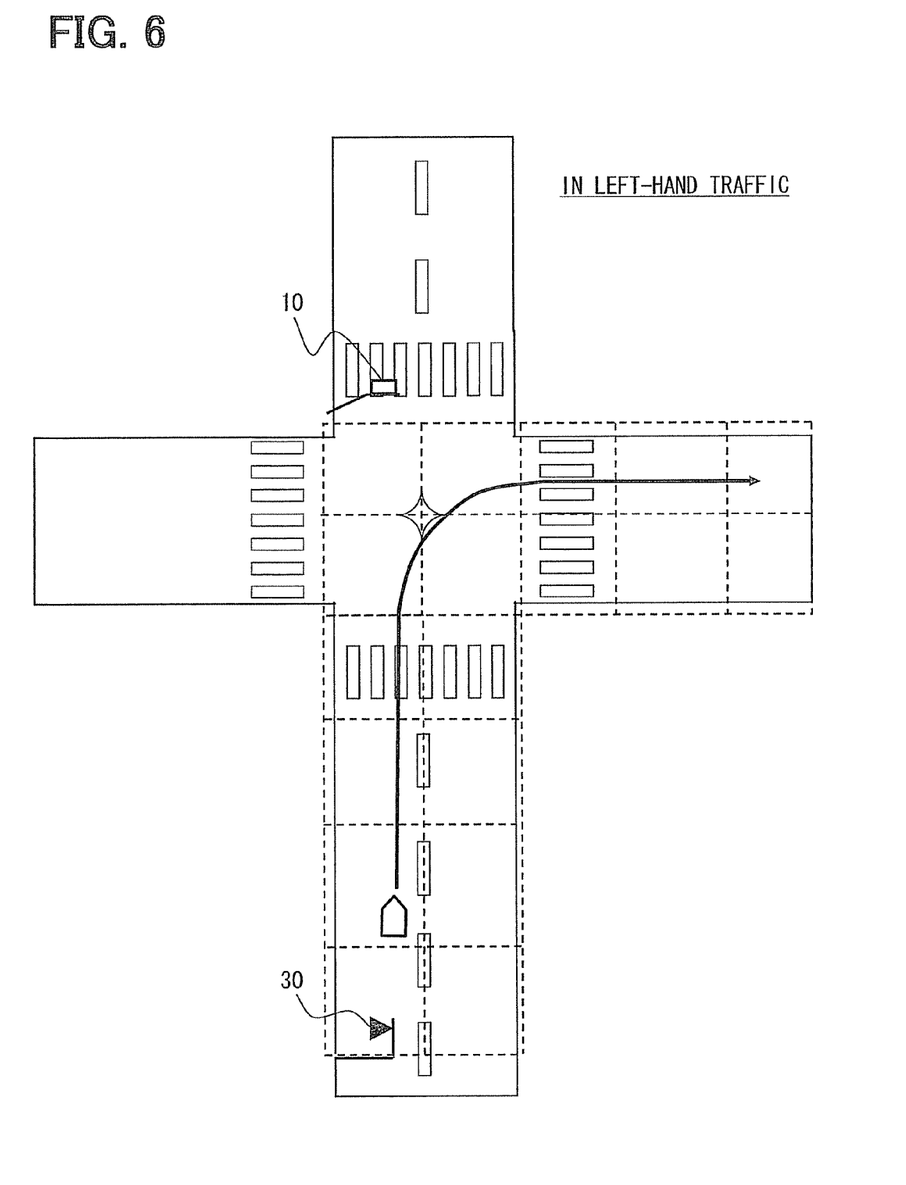
FIG. 6 is a diagram illustrating examples of several warning regions.
Figure 7:
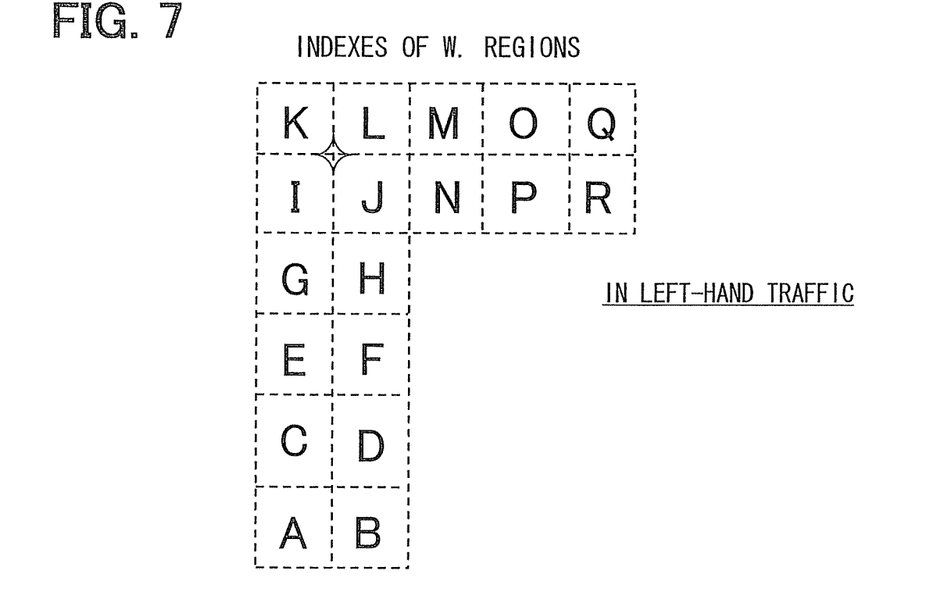
FIG. 7 is a diagram illustrating an example of an index assigned to each warning region in FIG. 6.

At S1, the processor 170 designates several warning regions into which a road area or a peripheral area of the road is divided. FIG. 6 is a diagram illustrating examples of several warning regions. Each warning region is represented by a single rectangle region surrounded with broken lines. In the example of FIG. 6, the assistance service area contains several warning regions (e.g., 18 regions) along a road entering the intersection and a road exiting from the intersection. In other words, the warning regions are defined based on the road configuration relative to travel directions. At S1, the warning regions are assigned with respective indexes. FIG. 7 is a diagram illustrating an example of an index assigned to each warning region in FIG. 6.

The designation of the warning regions may be achieved as follows. For instance, the roadside communication apparatus 10 may transmit the information which indicates boundaries of the warning regions successively; then, the processor 170 may acquire the information via the communication-related sensor instrument 110, thereby designating the warning regions. Further, for instance, the information which indicates the boundaries of the warning regions may be previously stored in the storage instrument 180 along with the road map database.

At S2, the predicted travel route is acquired from the route prediction instrument 140. At S3, a region priority is designated to each warning region designated at S1. That is, a correspondence relation (also referred to as a warning region map) is designated between the warning regions and the region priorities, respectively. The designated warning region map is stored in the storage instrument 180. The processing at S3 by the processor 170 may function as a correspondence relation designation section, device or means or a warning region map designation section, device, or means.

In the present embodiment, the region priority is designated using the road map information and the predicted travel route. First, the region priority is designated from the road map information; second, the region priority is defined also from the predicted travel route. Then, a final region priority is designated using these two region priorities eventually at S9 to be later.

Figure 8:
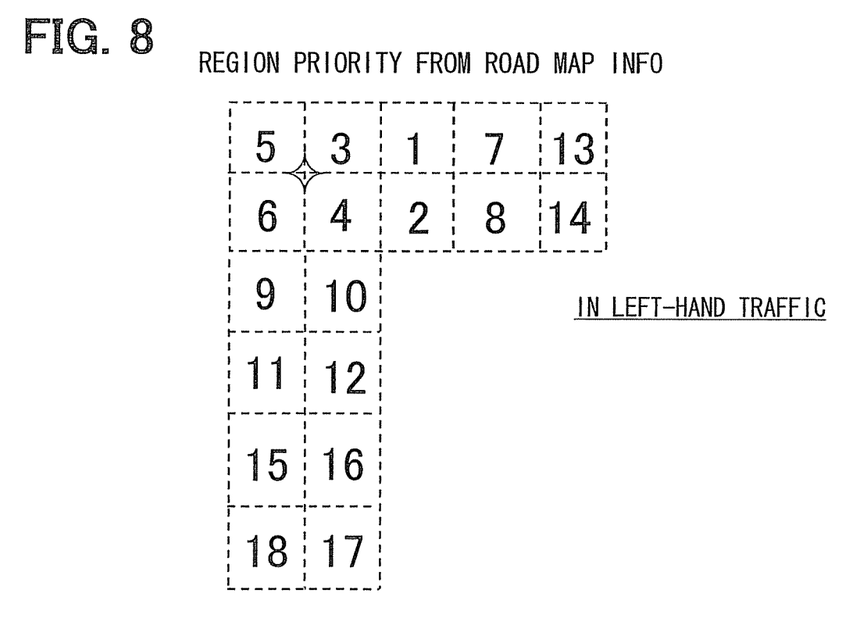
FIG. 8 is a diagram illustrating an example of a region priority defined from road map information.
Figure 9:
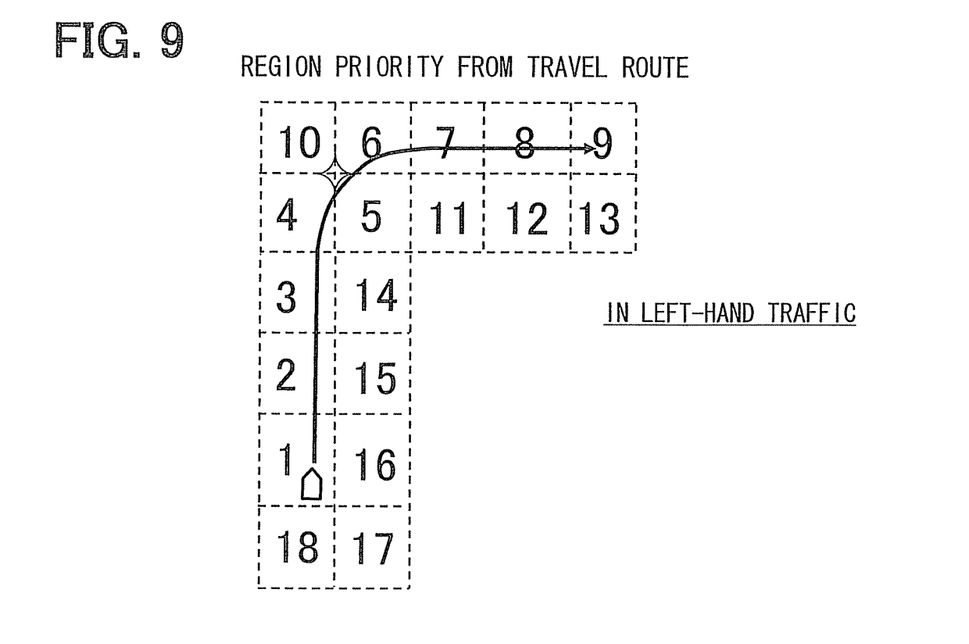
FIG. 9 is a diagram illustrating an example of a region priority defined from a predicted travel route.

FIG. 8 illustrates an example of a region priority defined from the road map information. In the example of FIG. 8, the warning region (M) including the crosswalk (not shown to FIG. 8) across or through which the subject vehicle passes after turning right is assigned with the highest priority (i.e., "1" in FIG. 8). There are two warning regions (M, N) containing the crosswalk across which the subject vehicle runs after the right-turn. Between the two warning regions (M, N), a higher priority is given to the warning region (M) across which the subject vehicle passes after the right-turn in preference to the warning region (N), which is assigned with the second highest priority "2". Subsequent to the warning regions (M, N), the warning regions (L, J, K, I) within the intersection are assigned with higher priorities. As the warning region is separate farther from the crosswalk or the intersection, it is assigned with a lower priority. The region priorities exemplified in FIG. 8 may be transmitted from the roadside communication apparatus 10 together with the information which indicates the boundaries of the warning regions. In addition, the region priorities exemplified in FIG. 8 may be stored previously in the storage instrument 180 along with the information which indicates the boundaries of the warning regions. FIG. 9 illustrates an example of a region priority defined from the predicted travel route. FIG. 9 also illustrates a predicted travel route using an arrow. In addition, a graphic sign indicated at the origin point of the arrow indicates a present position of the subject vehicle. In the example of FIG. 9, a higher priority is given to a warning region including the predicted travel route rather than a warning region not including the predicted travel route. Further, in particular, a much higher priority is given to a warning region closer to the present position of the subject vehicle, among the warning regions containing the predicted travel route. In addition, among the warning regions which do not include the predicted travel route, a higher priority is given to a warning region included in the intersection; as a warning region is separate farther from the intersection, the warning region is assigned with a lower priority.

Figure 10:
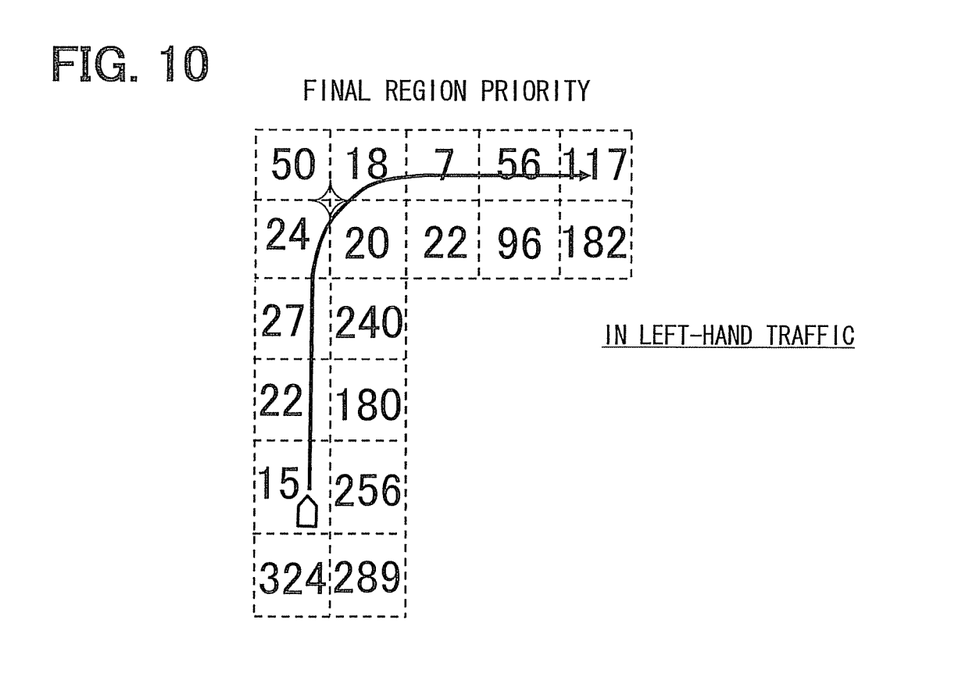
FIG. 10 is a diagram illustrating a final region priority.

FIG. 10 illustrates a final region priority. The region priority indicated in FIG. 10 is calculated as a product of the region priority indicated in FIG. 8 and the region priority indicated in FIG. 9, i.e., a multiplication between the region priority indicated in FIG. 8 and the region priority indicated in FIG. 9.

The explanation is returned to the flowchart of FIG. 5. After designating and storing the warning region map at S3, the processing proceeds to S4 where the processor 170 may function as an obstacle position acquisition section, device, or means. At S4, the processor 170 acquires an obstacle detection result of the periphery of the intersection that is transmitted from the roadside communication apparatus 10 via the communication-related sensor instrument 110. The roadside communication apparatus 10 transmits also information of the roads other than the road the subject vehicle runs, to the processor 170. In this regard, however, the processor 170 selects only a part of the information necessary for the subsequent processing. In addition, the positions of other vehicles in the periphery can be also received from the communication-related sensor instrument 110. Further, signals may be acquired from the in-vehicle autonomous sensor instrument 120; thereby, based on the acquired signals, the obstacle detection process may be executed.

At S5, each obstacle whose existence is detected at S4 is assigned with an index. At S6, the static feature of each obstacle assigned with the index is determined. The static feature includes a kind and a position of each obstacle. The kind of the obstacle includes a person and a vehicle. The kind of each obstacle is determined based on the magnitude or size, or the shape of the obstacle, for example. In addition, based on the kind of the obstacle, the capability or potential in acceleration and deceleration may be determined with respect to the obstacle. In detail, when an obstacle is a vehicle, the obstacle may be assigned with a numerical value which indicates a high acceleration capability.

At S7, the dynamic feature of each obstacle assigned with the index is determined. The dynamic feature includes a movement state of each obstacle such as a moving speed and a moving direction at the present time. This movement state is determined based on the temporal variation (i.e., time-axis variation) in the position of each obstacle. Thus, the processor 170 may function as an obstacle information acquisition section, device, or means at S4 to S7.

At S8, a collision possibility with the subject vehicle is calculated with respect to each obstacle assigned with the index. The calculated result is stored in the storage instrument 180 as a collision possibility list. The processing at S8 by the processor 170 may function as a collision possibility determination section, device or means. In calculation of the collision possibility, a predicted position of the obstacle in the passage of time is determined based on the static feature determined at S6, and the dynamic feature determined at S7. The collision possibility with the subject vehicle is calculated with respect to each obstacle from the temporal variation in the predicted position and the predicted travel route of the subject vehicle acquired at S2. The calculation of the collision possibility may be made based on other bases. For example, the collision possibility may be calculated based on the distance between the obstacle and the subject vehicle at the same clock time. This calculation is based on the predicted positions; thus, the prediction accuracy of the position also influences the collision possibility. For instance, if a vehicle is determined to be stopping because of failure, the prediction accuracy is high. In the case where the predicted position of the subject vehicle overlaps the position of the stopping vehicle at the same clock time, the collision possibility is supposed to be very high.

When the collision possibility is calculated based on the distance between the obstacle and the subject vehicle at the same clock time, it is not determined that the collision occurs when the distance is equal to or greater than a threshold value or distance. In contrast, it is determined that the collision occurs when the distance is less than the threshold value or distance. That is, the collision possibility is determined based on the distance. The threshold value may be a fixed value or a changeable value depending on the static feature of the obstacle. The warning region is determined to include a clock time at which a collision may occur and a position at which a collision may occur, with respect to the obstacle having a collision possibility. It is noted that the region priority is assigned with a smaller number as the priority is higher. To follow the region priority, the collision possibility is calculated to be smaller as the possibility is higher accordingly. For example, the collision possibility is first calculated by a percentage; then, an inverse number of the percentage is obtained eventually so as to be used at S9. For instance, the percentage of 1% (=1/100) is represented as "100" eventually.

At S9, the region priority specific to each obstacle assigned with the index is determined. The processing at S9 by the processor 170 may function as an obstacle-specific region priority determination section, device or means. The correspondence relation (i.e., the warning region map) between each warning region and the region priority is designated at S3, as explained above. At S9, the region priority relative to each obstacle is determined using the region of each obstacle and the warning region map determined at S3. The region of the obstacle may be a region in which the obstacle exists at the present time. In addition, it may be a predicted region in which the obstacle may exist in a near future. In the present embodiment, with respect to an obstacle that is determined to have a collision possibility to collide with the subject vehicle, the warning region is defined as including the position at which a collision may occur. With respect to an obstacle that is not determined to have a possibility to collide with the subject vehicle, the warning region is defined as being a position at which the obstacle is located at the present time. Further, with respect to an obstacle that is not determined to have a collision possibility to collide with the subject vehicle, a region priority may not be determined.

The processing at S10 by the processor 170 may function as a notification priority determination section, device or means to calculate a notification priority from the collision possibility list calculated at S8 and the region priority of each obstacle determined at S9. For example, a product of the collision possibility calculated at S8 and the region priority of each obstacle determined at S9 may be used as a notification priority. In the case of using such a product, as a value is smaller, the priority is higher.

The processing at S11 by the processor 170 may function as a notification section, device, or means to output a warning via the notification instrument 150 based on the notification priority calculated at S10. The image exemplified in above-mentioned FIG. 4 is displayed on the display as the notification apparatus 150, for example. Here, FIG. 4 indicates only an example; various display examples can be alternatively presented. For example, the number of the obstacles as a target of the warning notification may be only a single obstacle, or may be a predetermined maximum number or less. In addition, an obstacle having a notification priority not greater than a predetermined value may be reported at the same time. Separately from the number of the obstacles the warning notification of which is presented at the same time, the number of obstacles the warning notification of which is presented may be limited by a condition that the notification priority is equal to or less than a predetermined value, or be limited to a predetermined number of obstacles in an order from a higher notification priority. In cases that the number of obstacles of which the warning notification at the same time is made is limited to a single obstacle and the number of the obstacles of which the warning notification is made is several, the warning notifications relative to the several obstacles are made in an order from a higher warning notification priority. In addition, the information or content of the warning may be presented as an existence position of the obstacle, as an existence region of the obstacle, or as a kind of the obstacle. Thus, the number of the obstacles of which the notification is made, and the contents of the warning may be modified variously. In the present embodiment, even if the collision possibility is low, the notification priority becomes high when the region priority is high. That is, even if the collision possibility is low, a warning may be executed preferentially. Thus, the manner or style of the warning notification is determined based on the collision possibility. For example, an obstacle having a low collision possibility is represented using a predetermined obstacle graphic sign with white color. In contrast, an obstacle having a high collision possibility is represented using the same predetermined obstacle graphic sign with red color or with a flushing state. Furthermore, it is possible to also display a graphic sign to urge an attention, apart from the obstacle graphic sign. Further, the number of the obstacles of which the warning notification is made at the same time is several, the notification manners of the different obstacles may be differentiated from each other depending on their collision possibilities. Alternatively, the obstacle graphic signs simultaneously displayed may be differentiated from each other in respect of highlight manner based on the notification priorities.

At S12, it is determined whether the service condition mentioned above is satisfied. When it is determined that the service condition is satisfied at S12, the processing returns to S2. Therefore, while the service condition is satisfied, the predicted travel route is updated successively; the region priority of each region is also updated based on the updated predicted travel route. In addition, the obstacle detection result is also updated; the notification priority is also successively updated based on the updated detection result.

When the subject vehicle exits from the service area, or when the right direction indicator is turned into an OFF state, the service condition is not satisfied at S12, thereby ending the process in FIG. 5.

As explained above, according to the present embodiment, the warning output is made based on the notification priority (S11). The notification priority is determined from two of (i) the collision possibility between the obstacle and the subject vehicle and (ii) the region priority specific to an obstacle, instead of only from the collision possibility (S10). Even if the collision possibility is high, the notification priority may become low when the region priority is low. By contrast, even if the collision possibility is low, the notification priority may become high when the region priority is high. Therefore, under the present embodiment, the warning or warning notification to the driver with respect to obstacles can be executed effectively in an order of the necessity of urging the driver to take precautions, in comparison with the case where the notification priority is determined only based on the collision possibility.

In addition, in the present embodiment, the warning region is designated based on the configuration relative to a travel or traffic flow in a road map (FIG. 6). The final correspondence relation (FIG. 10) between the warning regions and the region priorities are determined by modifying or amending the priority (FIG. 8) defined from the road map information using the priority (FIG. 9) defined from the predicted travel route. Thus, a region assigned with a higher priority from the road map information such as a crosswalk is assigned with a higher region priority; a region closer to the subject vehicle along the predicted travel route is assigned with a higher priority. Furthermore, when a region is assigned with a higher priority from the road map information and is also assigned with a higher priority from the positional relation with the predicted travel route of the subject vehicle, such a region is naturally assigned with a much higher region priority. As a result, such a region is apt to be finally assigned with a higher notification priority; thus, the notification of this region is apt to be reported to the driver preferentially.

Suppose the case where under the region priorities designated as illustrated in FIG. 10, a pedestrian exists in the region N and an oncoming vehicle is predicted to reach the region J. In this case, even if the collision possibility of the oncoming vehicle predicted to reach the region 3 in a future is lower than the collision possibility of the pedestrian who exists in the region N, the final notification priority with respect to the oncoming vehicle and the region J may become high, thereby executing a notification preferentially.

The embodiment of the present invention is described in the above; however, the present invention is not limited to the above embodiment. The following embodiment is also included in the technical scope of the present invention; furthermore, another embodiment or modification other than the following is also included in the technical scope of the present invention as long as not deviating from the technical subject matter.

In the foregoing embodiment, the priority (FIG. 8) defined from the road map information is amended using the priority (FIG. 9) defined from the predicted travel route, thereby obtaining or designating the final correspondence relation. Without need to be limited thereto, the correspondence relation in FIG. 8 or FIG. 9 may be defined as a final correspondence relation. At the time of turning right at an intersection in the left-hand traffic rule, the driver needs to pay attention first to an oncoming vehicle in a time order. Therefore, there is a possibility of not paying an attention sufficiently to a pedestrian as an obstacle on a crosswalk, to which the attention needs to be paid next to the oncoming vehicle in the time order. In contrast, when the correspondence relation indicated in FIG. 8 is defined as a final correspondence relation, an obstacle located or predicted to be located in a crosswalk is reported preferentially. The obstacle in the region to which the driver does not pay attention sufficiently may be easily recognized by the preferential notification. In addition, in the case where a road oncoming vehicles run is congested, a driver of the subject vehicle is waiting for the right turn in the left-hand traffic rule may not easily see or recognize a crosswalk existing across the oncoming traffic lane or road. When the region which includes the crosswalk is assigned with a higher priority, as indicated in FIG. 8, the driver can know preferentially the existence of an obstacle on the crosswalk which is not easily seen or recognized across the road, which is congested by the oncoming vehicles, from the viewpoint of the driver of the subject vehicle.

Further, in the foregoing embodiment, all the region priorities designated to the warning regions have values different from each other. As long as all the region priorities are not identical, some of them may be assigned with the same value. For example, in FIG. 9, the same priority may be assigned to the regions that are not included in the predicted travel route.

Further, in the foregoing embodiment, the existence of an obstacle is reported on condition that the subject vehicle exists in the assistance service area including the intersection. Without need to be limited thereto, the warning notification may be made even in a position other than an intersection or a periphery of the intersection.

Further, in the foregoing embodiment, the warning regions are designated based on the configuration of the road map. Without need to be limited thereto, the graphic shape of the warning regions may be determined based on the distance from the subject vehicle, and the predicted route of the subject vehicle. In addition, when the warning regions are designated based on the configuration of the road map, the warning region need not be rectangle. For example, the warning region may be configured to be a concentric circle centering on the center of the intersection; further, such a concentric circle may be divided along the circumference.

While aspects of the disclosure described herein are already recited in the preceding summary, further optional aspects thereto may be set out as follows.

For instance, as a first optional aspect of the disclosure, a predicted route determination device may further included to determine a predicted travel route of the vehicle. Herein, the correspondence relation designation section may designate the correspondence relation such that as a region is closer to the vehicle in a direction of the predicted travel route, the region is assigned with a higher priority.

When such a correspondence relation is designated, a higher priority is given to a region priority of an obstacle that passes through a region closer to a present position of the vehicle in a predicted travel route. As a result, an obstacle that passes through a region closer to a present position of the vehicle in a predicted travel route is assigned with a higher notification priority, and thus reported preferentially even if the collision possibility with the vehicle is low.

In the above first optional aspect of the disclosure, the predicted route determination device may determine the predicted travel route successively; and the correspondence relation determination section may designate the correspondence relation successively based on the successively predicted travel route.

Thus, even if the predicted travel route of the vehicle changed every moment, the correspondence relation corresponding to change of the predicted travel route can be designated.

Further, as a second optional aspect of the disclosure, the correspondence relation determination section may designate the regions based on a configuration of a road map in the periphery of the vehicle, and designate the correspondence relation that is defined with respect to each region based on information of the road map.

Thus, the notification priority specific to the obstacle can be determined using the region priority which is defined from the road map information.

The position of the crosswalk may be included in the above road map information, for example.

In the above second optional aspect of the disclosure, the correspondence relation designation section may designate the correspondence relation such that a region containing a crosswalk is assigned with a higher priority than a region surrounding the crosswalk.

Under the above correspondence relation, the region including a crosswalk is assigned with a higher priority than the region around the crosswalk. The obstacle existing or predicted to exist in the region containing the crosswalk is assigned with a higher region priority. As a result, even if the obstacle existing or predicted to exist in the region containing the crosswalk has a lower collision possibility than another obstacle existing or predicted to exist in the region not containing a crosswalk, the obstacle existing or predicted to exist in the region containing the crosswalk is assigned with a higher notification priority, thereby being reported preferentially.

In the first optional aspect, the correspondence relation designation section may designate the correspondence relation based on a configuration of a road map of the periphery of the vehicle, and designate a final correspondence relation by amending the correspondence relation in which a region priority with respect to each region is defined based on information of the road map such that a region closer to the vehicle along the predicted travel route determined by the predicted travel route determination device is assigned with a higher priority, based on the predicted travel route.

Under such a configuration, while the region assigned with a higher priority in view of the information of the road map is assigned with a higher region priority, a region closer to the vehicle along the predicted travel route is assigned with a higher region priority. Furthermore, when a region is assigned with a higher priority in view of the information of the road map and is also assigned with a higher priority in view of the positional relation with the predicted travel route of the vehicle, such a region is naturally assigned with a much higher region priority. As a result, such a region is apt to be finally assigned with a higher notification priority; thus, the notification of this region is apt to be reported to the driver preferentially.

Further, as a third optional aspect, the notification section may determine a notification manner based on an obstacle-specific collision possibility determined by the collision possibility determination section.

As explained above, the notification itself of an obstacle may be preferentially executed even if the collision possibility is low. The above optional aspect enables a determination as to whether the obstacle reported preferentially has a higher collision possibility by referring to the notification manner.

It will be obvious to those skilled in the art that various changes may be made in the above-described embodiments of the present invention. However, the scope of the present invention should be determined by the following claims.

What is claimed:

1. A vehicular obstacle notification apparatus in a vehicle to report an existence of an obstacle that exists in a periphery of the vehicle, the apparatus comprising:
a correspondence relation designation section to designate a plurality of regions in the periphery of the vehicle and then designate a correspondence relation between the regions and region priorities, respectively;
an obstacle position acquisition section to acquire a position of an obstacle which exists in the periphery of the vehicle;
a collision possibility determination section to determine an obstacle-specific collision possibility with the vehicle with respect to an obstacle whose position is acquired by the obstacle position acquisition section based on a static feature and a dynamic feature of the obstacle;
a region priority determination section to determine an obstacle-specific region priority with respect to an obstacle whose position is acquired by the obstacle position acquisition section based on (i) a correspondence relation designated by the correspondence relation designation section and (ii) a present position or a future position of the obstacle whose position is acquired by the obstacle position acquisition section;
a notification priority determination section to determine a notification priority specific to an obstacle whose position is acquired by the obstacle position acquisition section, based on (i) an obstacle-specific region priority determined by the obstacle-specific region priority determination section and (ii) an obstacle-specific collision possibility determined by the collision possibility determination section;
a notification section to execute a notification on the obstacle based on the notification priority determined by the notification priority determination section; and
a predicted route determination device to determine a predicted travel route of the vehicle,
wherein the correspondence relation designation section designates a final correspondence relation based on the correspondence relation being designated such that a higher region priority is assigned to a region being closer to the vehicle in a direction of the predicted travel route.

2. The vehicular obstacle notification apparatus according to claim 1,
wherein:
the predicted route determination device determines the predicted travel route successively; and
the correspondence relation determination section designates the correspondence relation successively based on the successively predicted travel route.

3. The vehicular obstacle notification apparatus according to claim 1, wherein the correspondence relation designation section designates the correspondence relation based on a configuration of a road map of the periphery of the vehicle, and designates the final correspondence relation by amending the correspondence relation in which a region priority with respect to each region is defined based on information of the road map such that a region closer to the vehicle along the predicted travel route determined by the predicted travel route determination device is assigned with a higher priority, based on the predicted travel route.

4. The vehicular obstacle notification apparatus according to claim 3,
wherein the correspondence relation designation section designates the correspondence relation such that a region containing a crosswalk is assigned with a higher priority than a region surrounding the crosswalk.

5. The vehicular obstacle notification apparatus according to claim 1,
wherein the notification section determines a notification manner based on an obstacle-specific collision possibility determined by the collision possibility determination section.

6. The vehicular obstacle notification apparatus according to claim 1, wherein:
the static feature includes a kind of the obstacle; the kind includes a person and a vehicle.

7. The vehicular obstacle notification apparatus according to claim 6, wherein:
the dynamic feature includes a movement state of the obstacle; the movement state includes at least one of a moving speed or a moving direction.

8. A vehicular obstacle notification apparatus in a vehicle to notify a driver of the vehicle of an obstacle that exists in a periphery of the vehicle,
the apparatus comprising:
a predicted route determination device to determine a predicted travel route of the vehicle;
an obstacle information acquisition section to acquire a position of an obstacle and a type of the obstacle, the position being included in the predicted travel route;
a correspondence relation designation section to designate a plurality of regions in the periphery of the vehicle based on a configuration of a road map and then designate a correspondence relation between the regions and region priorities, respectively,
wherein the correspondence relation is designated such that a crosswalk region overlapping with a crosswalk and an intersection region overlapping with an intersection are assigned with a higher priority as compared with a region other than the crosswalk region and the intersection region;
a region priority determination section to determine an obstacle-specific region priority with respect to an obstacle, whose position and type are acquired by the obstacle information acquisition section, the position of the obstacle being included in the predicted travel route; and
a notification section to execute a notification on obstacle based on the obstacle-specific region priorities determined by the region priority determination section, wherein in cases where the predicted travel route indicates that the vehicle needs to turn at the intersection by passing across oncoming traffic within the intersection and then pass across a crosswalk located after exiting the intersection,
when the acquired positions and the types of the obstacles indicate that a pedestrian serving as one of the obstacles exists or is predicted to exist in the crosswalk and an oncoming vehicle serving as one of the obstacles exists or is predicted to exist in the oncoming traffic within the intersection,
the obstacle-specific region priority assigned to the pedestrian is higher than the obstacle-specific region priority assigned to the oncoming vehicle.

9. The vehicular obstacle notification apparatus according to claim 8, wherein the type of the obstacle includes a person and a vehicle.

10. A vehicular obstacle notification apparatus in a vehicle to notify a driver of the vehicle of an obstacle that exists in a periphery of the vehicle,
the apparatus comprising:
an obstacle position acquisition section to acquire a position of an obstacle which exists in the periphery of the vehicle;
an obstacle information acquisition section to acquire a kind and a movement state of the obstacle whose position was acquired by the obstacle position acquisition section;
a predicted route determination device to determine a predicted travel route of the vehicle;
a correspondence relation designation section to designate a plurality of regions in the periphery of the vehicle and then designate a correspondence relation between the regions and region priorities, respectively, the correspondence relation being designated such that a higher region priority is assigned to a region being closer to the vehicle in a direction of the predicted travel route;
a collision possibility determination section to determine an obstacle-specific collision possibility with the vehicle with respect to an obstacle whose position is acquired by the obstacle position acquisition section based on the kind and the movement state of the obstacle acquired by the obstacle information acquisition section;
a region priority determination section to determine an obstacle-specific region priority with respect to an obstacle, whose position is acquired by the obstacle information acquisition section, based on (i) a correspondence relation designated by the correspondence relation designation section and (ii) a present position or a future position of the obstacle whose position is acquired by the obstacle position acquisition section; and
a notification priority determination section to determine a notification priority specific to an obstacle whose position is acquired by the obstacle position acquisition section, based on (i) an obstacle-specific region priority determined by the obstacle-specific region priority determination section and (ii) an obstacle-specific collision possibility determined by the collision possibility determination section; and
a notification section to execute a notification on obstacle based on the notification priority determined by the notification priority determination section.

* * * * *